United States Patent
Ochiai

(10) Patent No.: US 6,932,729 B2
(45) Date of Patent: *Aug. 23, 2005

(54) COMPRESSOR HAVING A POWER TRANSMISSION MECHANISM WHICH PREVENTS BALLS FROM MOVING IN AN AXIAL DIRECTION

(75) Inventor: Yoshihiro Ochiai, Isesaki (JP)

(73) Assignee: Sanden Corporation, Gunma (JP)

( * ) Notice: Subject to any disclaimer, the term of this patent is extended or adjusted under 35 U.S.C. 154(b) by 58 days.

This patent is subject to a terminal disclaimer.

(21) Appl. No.: 10/309,133

(22) Filed: Dec. 4, 2002

(65) Prior Publication Data

US 2003/0104890 A1 Jun. 5, 2003

(30) Foreign Application Priority Data

Dec. 4, 2001 (JP) .................................... P2001-369592

(51) Int. Cl.[7] .............................................. F16H 61/00
(52) U.S. Cl. ...................................... 474/74; 192/56.1
(58) Field of Search .................... 474/69, 74; 192/56.1, 192/56.5; 464/35

(56) References Cited

U.S. PATENT DOCUMENTS

| | | | |
|---|---|---|---|
| 1,767,566 A | 6/1930 | Updike | |
| 1,941,061 A | 12/1933 | Thiry | |
| 2,356,842 A | 8/1944 | Helmond | |
| 3,058,321 A | 10/1962 | Aske | |
| 3,654,777 A | 4/1972 | Grundman | |
| 3,718,009 A | 2/1973 | Perina | |
| 4,748,865 A | 6/1988 | Umezawa et al. | |
| 5,377,962 A | 1/1995 | Ochs et al. | |
| 5,516,331 A | 5/1996 | Morr et al. | |
| 5,531,307 A | * 7/1996 | Fechter et al. | ............. 192/56.4 |
| 5,564,981 A | 10/1996 | Iwabuchi et al. | |
| 5,704,839 A | 1/1998 | Michael et al. | |
| 5,857,913 A | * 1/1999 | Fujimura et al. | ............. 464/36 |
| 5,944,156 A | 8/1999 | Hatakeyama | |
| D460,093 S | 7/2002 | Ochiai | |
| D460,770 S | 7/2002 | Ochiai | |
| 6,425,837 B1 | 7/2002 | Ochiai | |
| 6,494,799 B1 | 12/2002 | Ochiai | |

FOREIGN PATENT DOCUMENTS

| | | | | |
|---|---|---|---|---|
| DE | 4120207 A1 | * 12/1992 | ............. | F16D/7/06 |
| GB | 751383 | 6/1956 | | |
| GB | 2069073 A | * 8/1981 | ............. | F16D/7/06 |
| JP | 8135752 | 5/1996 | | |
| JP | 09004564 | 1/1997 | | |

* cited by examiner

*Primary Examiner*—David A. Bucci
*Assistant Examiner*—Vicky A. Johnson
(74) *Attorney, Agent, or Firm*—Baker Botts L.L.P.

(57) ABSTRACT

A compressor includes a power transmission mechanism. The power transmission mechanism includes a shaft, and a first rotation member fixed to the shaft. The first rotation member includes a plurality of accommodation portions. The power transmission mechanism also includes a second rotation member rotatably arranged around the periphery of the first rotation member. The second rotation member has an inner surface facing the first rotation member, and the second rotation member includes a plurality of recessed hollows formed in the inner surface. The compressor further includes a plurality of balls. During operation, a first portion of each of the balls is positioned within a corresponding one of the accommodation portions, and a second portion of each of the balls is positioned within a corresponding one of the hollows, such that a rotational motion of the second rotation member is transmitted to the first rotation member via the balls. The compressor also includes a ring plate adapted to apply a predetermined amount of force to the balls. The predetermined amount of force is sufficient to maintain the balls within their corresponding accommodation portion. Moreover, the second rotation member includes one or more stopper portions which prevent the balls from moving in an axial direction within their corresponding hollow.

20 Claims, 8 Drawing Sheets

COMPRESSOR HAVING A POWER TRANSMISSION MECHANISM WHICH PREVENTS BALLS FROM MOVING IN AN AXIAL DIRECTION

BACKGROUND OF THE INVENTION

1. Field of the Invention

The present invention relates generally to a power transmission mechanism for a compression of a vehicle. In particular, the present invention is directed to a power transmission mechanism having a torque limiter.

2. Description of Related Art

Known compressors for a vehicle are driven by an engine of the vehicle via a power transmission mechanism. Known power transmission mechanisms, such as the power transmission mechanism described in U.S. Pat. No. 6,425,837 B1, have a torque limiter which prevents excessive torque generated by a seizure of the compressor from being transmitted to the engine of the vehicle. Specifically, such known power transmission mechanisms include a first rotation member and a second rotation member, and each rotation member includes accommodation portions. The first rotation member is fixed to a shaft of the known compressor, and the second rotation member is arranged, so as to rotate in accordance with a rotation of the engine of the vehicle.

Such known power transmission mechanisms, also include a plurality of balls coupled to the first rotation member and the second rotation member. During operation, a first portion of each of the balls is accommodated within the accommodation portion of the first rotation member, and a second portion of each of the balls is accommodated within the accommodation portion of the second rotation member, such that the each of the balls substantially couple the first rotation member to the second rotation member. Thus, during operation, the rotational motion of the second rotation member is transmitted to the first rotation member via the balls.

If a compressor containing such a power transmission mechanism seizes up, the first rotation member does not rotate smoothly, and the second rotation member pushes the balls toward the first rotation member. Consequently, the second rotation member uncouples from the first rotation member, such that excessive torque generated by the seizure of the compressor is not transmitted to the engine of the vehicle.

In known compressors, in order to maintain reliable operation of the balls, an area surrounding the balls may be filled with a rust inhibitor or a lubricant, e.g., a grease, or both. In order to ensure that the balls function as a torque limiter, the area is sealed off, such that foreign objects do not enter the area, and the rust inhibitor and the lubricant do not leak out of the area. Nevertheless, when such known compressors are turned off, a thrust occurs which forces the shaft to move inwardly. When the shaft moves inward, components coupled to the shaft are displaced, which may break the seal.

SUMMARY OF THE INVENTION

Therefore, a need has arisen for a power transmission mechanism which overcomes these and other shortcomings of the related art. A technical advantage of the present invention is that the power transmission mechanism may be adapted to maintain a seal surrounding a plurality of balls of the power transmission mechanism.

According to an embodiment of the present invention, a compressor comprises a power transmission mechanism. The power transmission mechanism comprises a shaft, and a first rotation member fixed to the shaft. The first rotation member comprises a plurality of accommodation portions. The power transmission mechanism also comprises a second rotation member rotatably arranged around the periphery of the first rotation member. The second rotation member has an inner surface facing the first rotation member, and the second rotation member comprises a plurality of recessed hollows formed in the inner surface. The power transmission mechanism further comprises a plurality of balls. A first portion of each of the balls is positioned within one or more corresponding accommodation portion, and a second portion of each of the balls is positioned within one or more corresponding hollow, such that a rotational motion of the second rotation member is transmitted to the first rotation member via the balls. The power transmission mechanism also comprises a ring plate adapted to apply a predetermined amount of force to the balls. The predetermined amount of force is sufficient to maintain the balls within their one or more corresponding accommodation portion. Moreover, the second rotation member comprises means for preventing the balls from moving in an axial direction within their one or more corresponding hollow. For example, the means for preventing the balls from moving in the axial direction may comprise one or more stopper portions of the hollow, e.g., a pair of side walls which engage the outer surface of the ball.

According to another embodiment of the present invention, a power transmission mechanism comprises a shaft, and a first rotation member fixed to the shaft. The first rotation member comprises a plurality of accommodation portions. The power transmission mechanism also comprises a second rotation member rotatably arranged around the periphery of the first rotation member. The second rotation member has an inner surface facing the first rotation member, and the second rotation member comprises a plurality of recessed hollows formed in the inner surface. The power transmission mechanism further comprises a plurality of balls. A first portion of each of the balls is positioned within one or more corresponding accommodation portion, and a second portion of each of the balls is positioned within one or more corresponding hollow, such that a rotational motion of the second rotation member is transmitted to the first rotation member via the balls. The power transmission mechanism also comprises a ring plate adapted to apply a predetermined amount of force to the balls. The predetermined amount of force is sufficient to maintain the balls within their one or more corresponding accommodation portion. Moreover, the second rotation member comprises means for preventing the balls from moving in an axial direction within their one or more corresponding hollow. For example, the means for preventing the balls from moving in the axial direction may comprise one or more stopper portions of the hollow, e.g., a pair of side walls which engage the outer surface of the ball.

Other objects, features, and advantages of the present invention will be apparent to persons of ordinary skill in the art in view of the foregoing detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DESCRIPTION OF PREFERRED EMBODIMENTS

Figure 1:
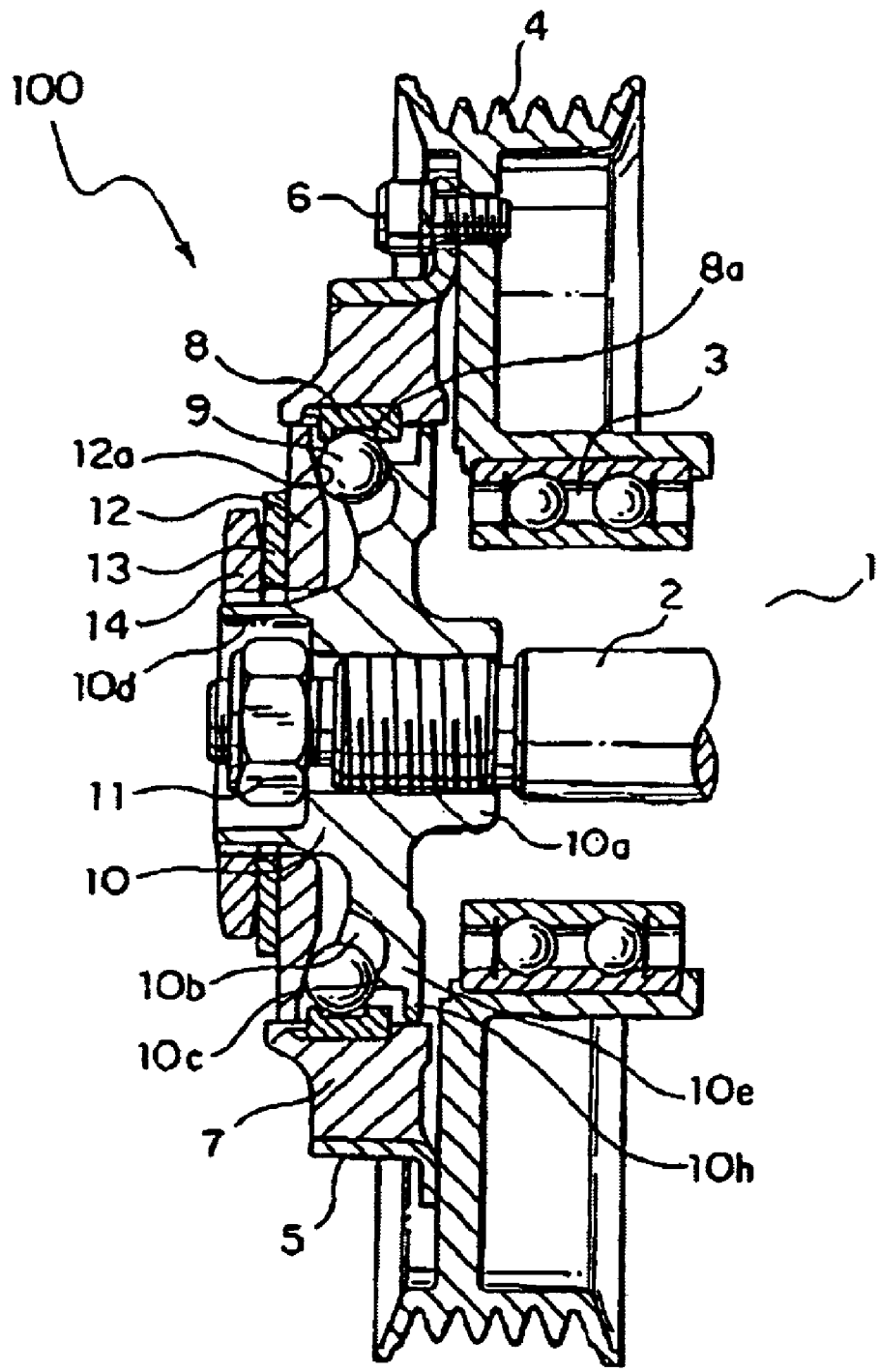
FIG. 1 is a partial, cross-sectional view of a compressor, according to an embodiment of the present invention.
Figure 2:
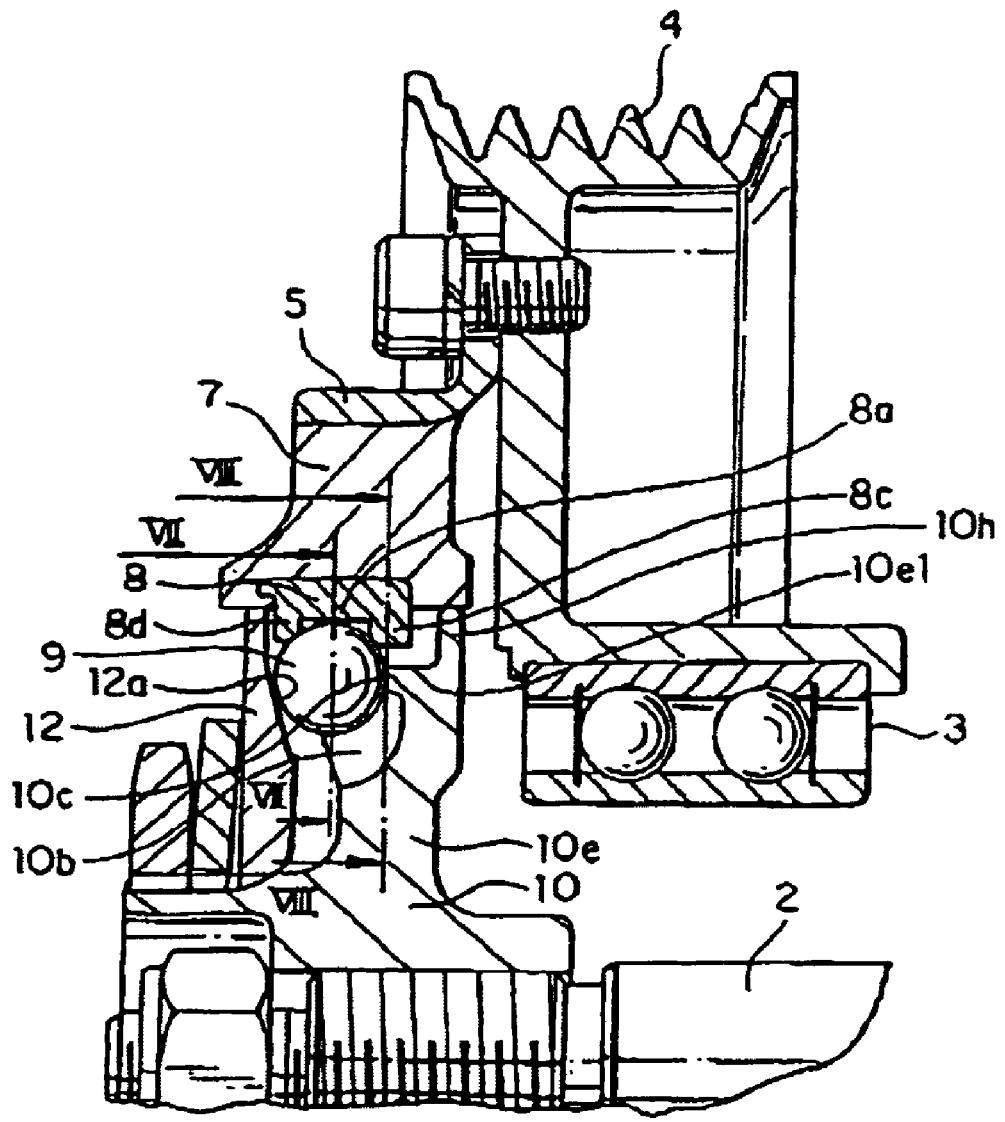
FIG. 2 is an enlarged, cross-sectional view of a power transmission mechanism of the compressor FIG. 1.
Figure 3:
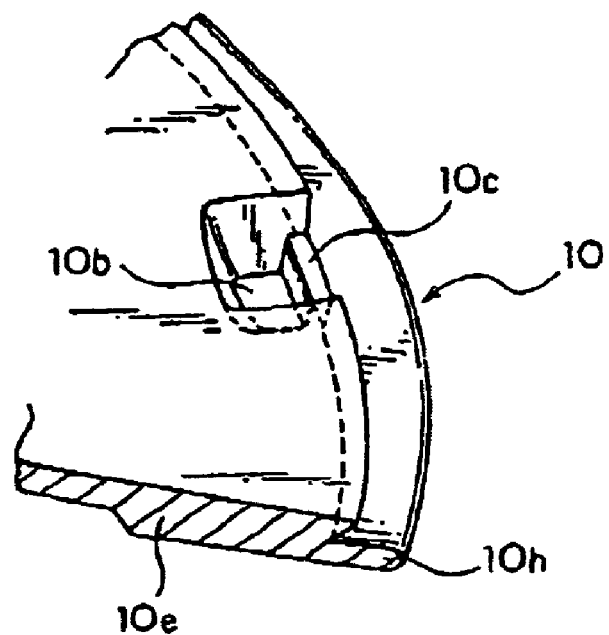
FIG. 3 is a partial, perspective view of a hub of the compressor of FIG. 1.
Figure 4:
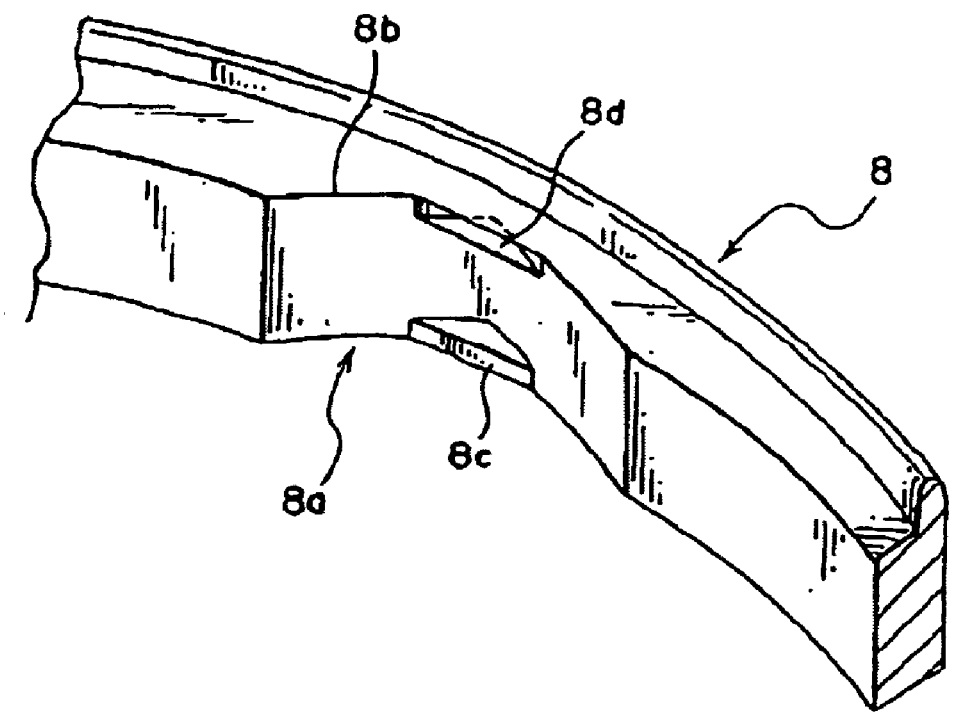
FIG. 4 is a partial, perspective view of an inner ring of the compressor of FIG. 1.
Figure 5:
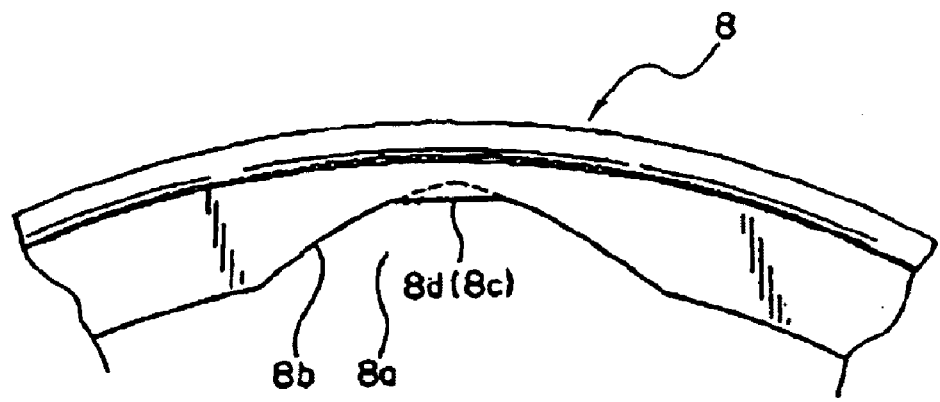
FIG. 5 is a partial, top plan view of the inner ring of FIG. 4.
Figure 6:
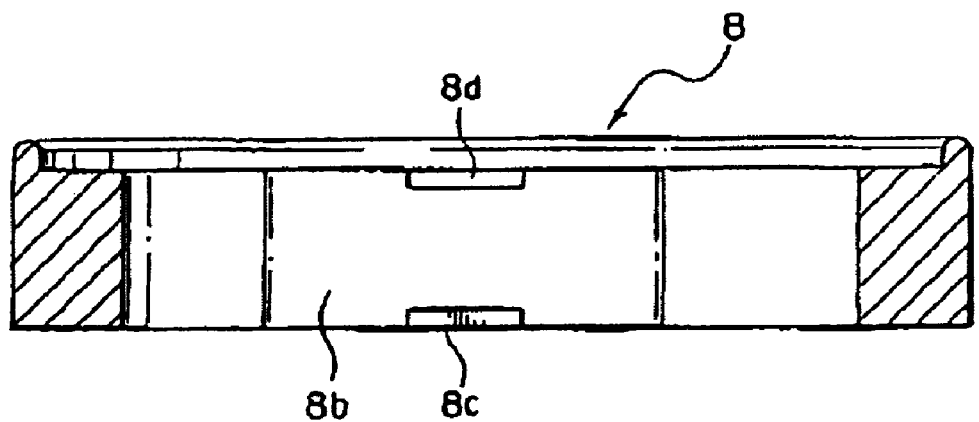
FIG. 6 is a partial, front view of the inner ring of FIG. 4.
Figure 7:
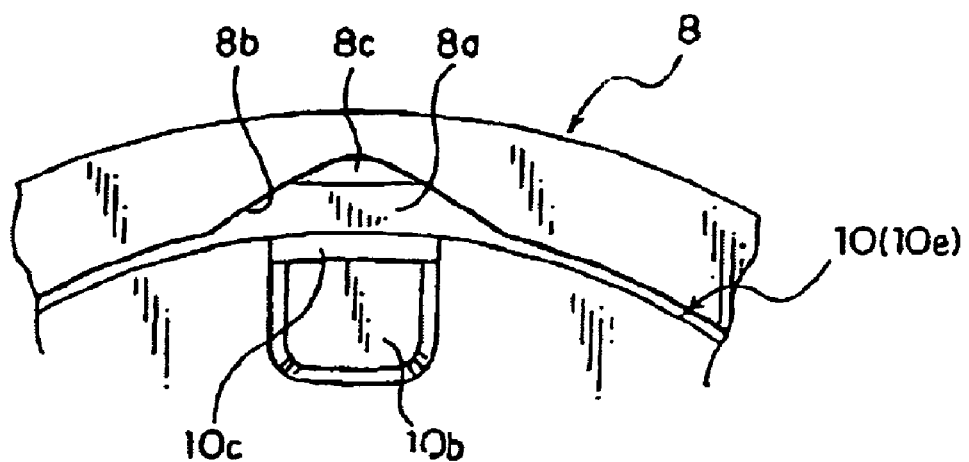
FIG. 7 is a partial, cross-sectional view of the power transmission mechanism taken along line VII—VII.
Figure 8:
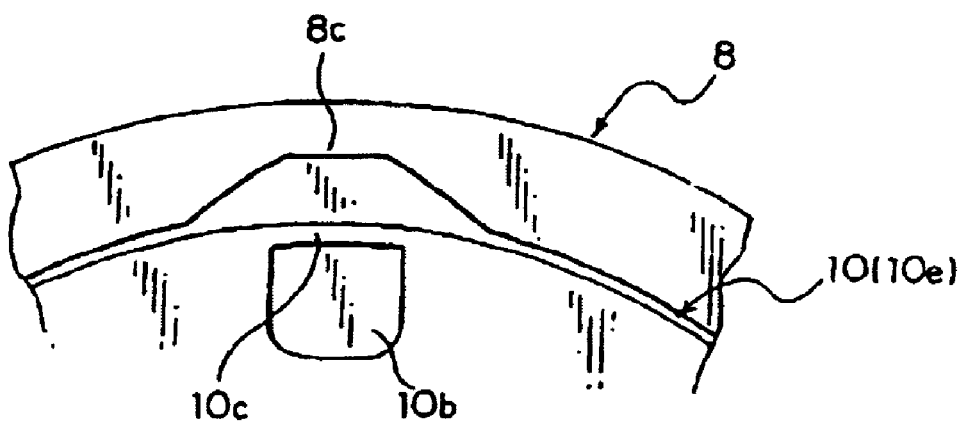
FIG. 8 is a partial, cross-sectional view of the power transmission mechanism of FIG. 2 taken along line VIII—VIII.
Figure 9:
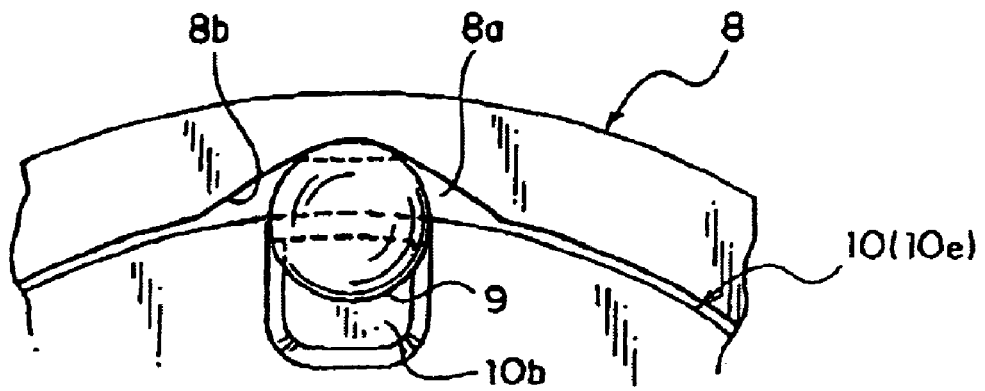
FIG. 9 is a partial, cross-sectional view showing the power transmission mechanism of FIG. 2 during operation, taken along line VII—VII.
Figure 10:
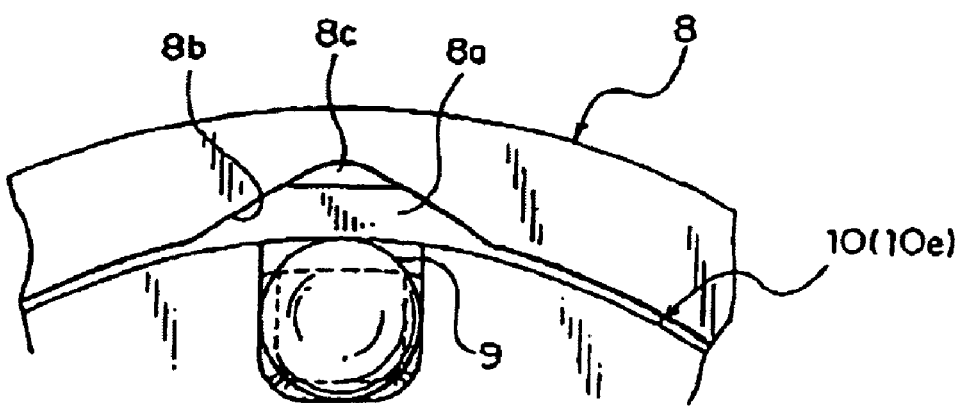
FIG. 10 is a partial, cross-sectional view showing the power transmission mechanism of FIG. 2 when a seizure occurs, taken along line VII—VII.

Preferred embodiments of the present invention and their advantages may be understood by referring to FIGS. 1–13, like numerals being used for corresponding parts in the various drawings.

Referring to FIGS. 1–10, an embodiment of the present invention is depicted. In the first embodiment, a compressor 1 may include a power transmission mechanism 100. Power transmission mechanism 100 may comprise a hub 10, e.g., a first rotation member fixed to a shaft 2 of compressor 1. Hub 10 may comprise a portion 10a, a cylindrical portion 10d, and a disc portion 10e. Within cylindrical portion 10d, a nut 11 may be fitted on a tip of shaft 2, such that portion 10a is fixed to shaft 2. On cylindrical portion 10d, a ring plate 12 and a belleville spring 13 may be fitted together via a nut 14. As such, shaft 2 and ring plate 12 may rotate when hub 10 rotates, and belleville spring 13 may apply a predetermined amount of force to ring plate 12. The predetermined amount of force may be adjusted by altering a position of nut 14. Moreover, the predetermined amount of force may be applied to balls 9 via ring plate 12. A ball bearing 3 may be positioned on a front end of a front housing of a compressor 1, and a pulley 4 may be fixed to an outer portion of ball bearing 3, such that pulley 4 rotates in accordance with a rotation of the an engine of the vehicle. An axis of rotation of pulley 4 may be the same as an axis of rotation of shaft 2. An outer ring 5 may be fixed to a first side of pulley 4 via a plurality of bolts 6. Moreover, an inner ring 8, e.g., a second rotation member, may be fixed to outer ring 5 in a radial direction of shaft 2 via a vulcanized rubber ring 7. Rubber ring 7 may be an elastically deformable member, and also may provide shock absorption between outer ring 5 and inner ring 8. Thus, pulley 4, rubber ring 7, outer ring 5, and inner ring 8 may rotate together in accordance with the rotation of the engine.

Power transmission mechanism 100 also may include a plurality of balls 9 and balls 9 may be arranged at regular intervals between inner ring 8 and operating hub 10. Under normal operating conditions, a first portion of each ball 9 may be accommodated in inner ring 8, and a second portion of each ball 9 may be accommodated in hub 10. Thus, balls 9 may couple inner ring 8 to hub 10, such that a rotational motion of inner ring 8 may be transmitted to hub 10 via balls 9.

Further, a flange portion 10h may project from disc portion 10e of hub 10. Flange portion 10h may contact rubber ring 7 in a radial direction, and an edge of ring plate 12 may contact rubber ring 7 in the radial direction. Thus, an area defined by rubber ring 8, ring plate 12, and hub 10 may be sealed off. The area may be filled with a rust inhibitor or a lubricant, or both, which may maintain reliable operation of balls 9.

Disc portion 10e of hub 10 may comprise a plurality of pockets 10b, and a plurality of pedestal portions 10c may be formed on a periphery of disc portion 10e at regular intervals. The number of pockets 10b and the number of pedestal portions 10c may be same as the number of balls 9. Each pedestal portion 10c may be positioned below a surface of disc portion 10e in an axial direction of shaft 2. During operation, pedestal portions 10c may support their corresponding ball 9. Pockets 10b may be formed inside, and integral with, their corresponding pedestal portion 10c. Pockets 10b may be hollow in the radial direction and in the axial direction, and each pocket 10b may be deeper than their corresponding pedestal portion 10c in the axial direction. The respective pairs of pedestal potions 10c and pockets 10b may serve as accommodation portions for balls 9.

Inner ring 8 may have a plurality of recessed hollows 8a formed at an inner wall surface of inner ring 8. The number of hollows 8a may be the same as the number of balls 9, and hollows 8a may be recessed in the radial direction. Each hollow 8a may be defined by an inside wall 8b, and inside wall 8b may have a pair of sloped surfaces and a bottom portion which connects the pair of sloped surfaces. A shape and a size of the bottom portion of inside wall 8b may correspond to the shape and the size of ball 9.

Each hollow 8a also may have a pair of partial side walls 8c, 8d. Partial side walls 8c and 8d may be spaced from each other in the axial direction, such that under non-operating conditions, partial side walls 8c and 8d contact ball 9 at opposite sides. Partial side walls 8c and 8d may be adapted to prevent balls 9 from moving in the axial direction, e.g., partial side walls 8c and 8d may suppress the thrust in the axial direction. For example, partial side wall 8c may not be in contact with a peripheral side surface 10e1 of disc portion 10e of the hub 10. Moreover, during operation, ball 9 may contact the bottom portion of wall 8b, and partial side walls 8c and 8d may prevent movement of ball 9 in the axial direction.

During operation, each ball 9 may be positioned on pedestal portions 10c, and a portion of ball 9 may be accommodated in hollow 8a, such that ball 9 may contact the bottom portion and partial side walls 8c and 8d. Thus, during operation, ball 9 may be fixed between inner ring 8 and hub 10 by the predetermined force of ring plate 12, and also may be prevented from moving in the axial direction by partial side walls 8c and 8d.

When compressor 1 seizes up, and shaft 2 does not rotate smoothly, a reaction force caused by the seizure of compressor 1 and a torque associated with inner ring 8 may be greater than the predetermined force of ring plate 12. Consequently, ball 9 may be displaced towards hub 10 by inside wall 8b. Specifically, ball 9 may move inside hub 10 into pocket 10b. As such, inner ring 8 no longer is coupled to hub 10, and excessive torque caused by the seizure of compressor 1 is not transmitted to the engine of the vehicle.

Figure 11:
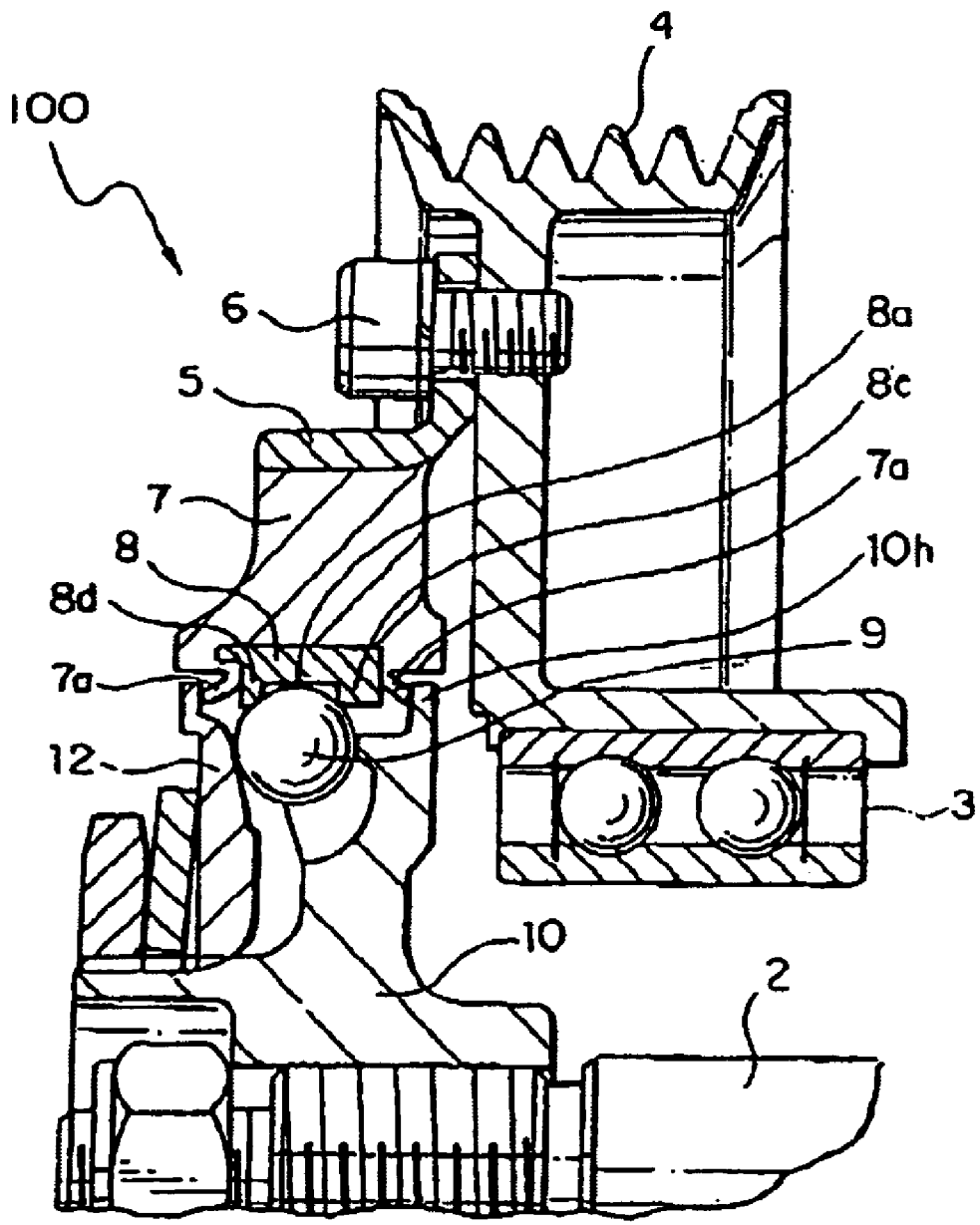
FIG. 11 is an enlarged, cross-sectional view of a power transmission mechanism, according to another embodiment of the present invention.

Referring to FIG. 11, power transmission mechanism 100 according to another embodiment of the present invention is depicted. The features and advantages of this embodiment of the present invention are substantially similar to the features and advantages of the previous embodiment of the present invention. Therefore, the features and advantage of the previous embodiment of the present invention are not discussed further with respect to the this embodiment of the present invention.

In this embodiment of the present invention, the edge of ring plate 12 may be separate from rubber ring 7, and flange 10h also may be separate from rubber ring 7. Moreover, rubber ring 7 may comprise a plurality of seal lips 7a, and seal lips 7a may be formed integral with, or separate from rubber ring 7. Seal lips 7a also may extend from rubber ring 7 towards ring plate 12 and flange 10h, respectively, in a direction offset from both the radial direction and the axial direction, e.g., in a diagonal direction between the radial direction and the axial direction, such that the edges of seal lips 7a contact an end portion of ring plate 12 and an end portion of flange 10h, respectively. Each seal lip 7a may be formed inside rubber ring 7. Thus, the area surrounding balls 9 may be sealed off by seal lips 7a, and foreign objects may not enter the area. In addition, because seal lips 7a contact ring plate 12 and hub 10, friction between seal lips 7a and ring plate 12 may be reduced relative to the first embodiment. Similarly, friction between seal lips 7a and hub 10 may be reduced.

In a modification of this embodiment, seal lips 7a may extend form rubber ring 7 in the axial direction. In this modification, the edges of seal lips 7a contact ring plate 12 and hub 10 in the axial direction, such that the area surrounding balls 9 is sealed off.

Figure 12:
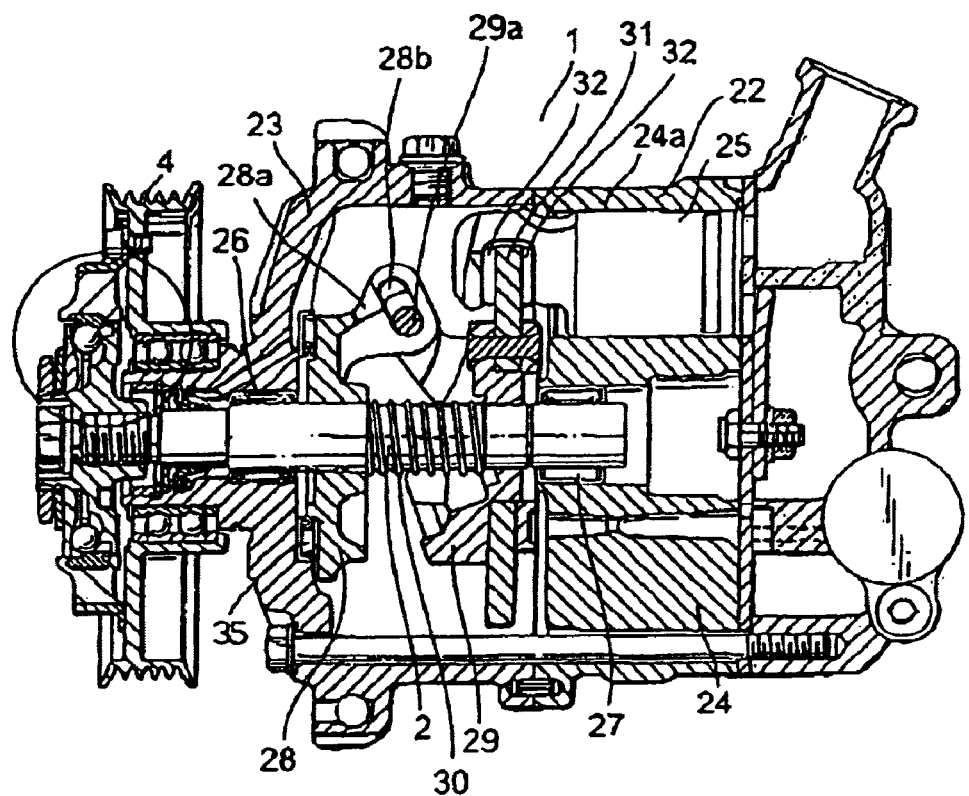
FIG. 12 is a cross-sectional view of a compressor which includes a power transmission mechanism, according to still another embodiment of the present invention.
Figure 13:
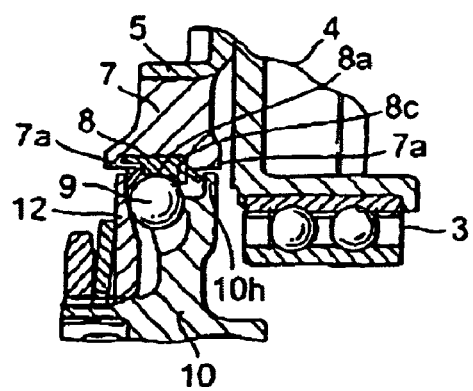
FIG. 13 is an enlarged, cross-sectional view of the power transmission mechanism of FIG. 12.

Referring to FIGS. 12 and 13, a power transmission mechanism 100 according to still another embodiment of the present invention is depicted. The features and advantages of this embodiment of the present invention are substantially similar to the features and advantage of the previous embodiments of the present invention. Therefore, the features and advantages of the previous embodiments of the present invention are not discussed further with respect to this embodiment of the present invention. In this embodiment, each hollow 8a of inner ring 8 may include a single side wall 8c, and side wall 8c may have a curved surface corresponding to the curved shape of ball 9.

In this embodiment, compressor 1 may be a variable displacement type compressor comprising a swash plate 31. An internal mechanism of the compressor 1 may be accommodated in a cylinder block 24 and a front housing 23, and pulley 4 may be rotatably attached to front housing 23 by ball bearing 3. Cylinder block 24 may comprise a plurality of cylinder bores 24a, and a piston 25 may be inserted inside each cylinder bore 24a. Shaft 2 may be rotatably supported by a radial bearing 26 disposed in front housing 23, and by a radial bearing 27 disposed in cylinder block 24. A rotor 28 comprising an arm 28a with an elongated hole 28b formed therethrough may be fixed to shaft 2. Compressor 1 also may comprise a supporter 29, and an inclination angle of supporter 29 may be adjusted relative to shaft 2. Supporter 29 may comprise a pin 29a, and pin 29a may be inserted into elongated hole 28b, such that pin 29a may move within hole 28b. A helical compression spring 30 may be positioned on shaft 2 between rotor 28 and supporter 29, and swash plate 31 may be fixed to supporter 29. Swash plate 31 may be coupled to end portions of pistons 25 via a pair of shoes 32. A thrust bearing 35 may be positioned between rotor 28 and front housing 23, and thrust bearing 35 may reduce the influence of the reaction force. When pulley 4 rotates, shaft 2 also rotates, such that pistons 25 reciprocate within their corresponding cylinder bores 24a. The stroke of each piston 25 may alter the inclination of the swash plate 31. Moreover, if the inclination angle of swash plate 31 is altered, a displacement of compressed gas is controlled. When compressor 1 is turned off, a thrust occurs which forces shaft 2 to move toward the back end of compressor 1. However, wall 8c may reduce or eliminate the influence of the thrust, such that the sealing is maintained.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A compressor comprising a power transmission mechanism, wherein the power transmission mechanism comprises:

a shaft;

a first rotation member fixed to the shaft, wherein the first rotation member comprises a plurality of accommodation portions;

a second rotation member rotatably arranged around the periphery of the first rotation member, wherein the second rotation member has an inner surface facing the first rotation member, and the second rotation member comprises a plurality of recessed hollows formed in the inner surface;

a plurality of balls, wherein a first portion of each of the balls is positioned within at least one of the accommodation portions and a second portion of each of the balls is positioned within at least one of the hollows, such that a rotational motion of the second rotation member is transmitted to the first rotation member via the balls; and a ring plate adapted to apply a predetermined amount of force to the balls, wherein the predetermined amount of force is sufficient to maintain the balls within their corresponding at least one accommodation portion, and wherein the second rotation member comprises means for preventing the balls from moving in an axial direction within their corresponding at least one hollow.

2. The compressor of claim 1, wherein each of the accommodation portions comprises:

a pedestal portion arranged on the periphery of the first rotation member in the radial direction, wherein each of the pedestal portions are adapted to support a corresponding one of the balls; and a pocket formed within the pedestal portion, such that the corresponding ball moves into the pocket when an inside wall of the hollow applies a force to the corresponding ball in a direction which is opposite to the predetermined force.

3. The compressor of claim 1, wherein the means for preventing the balls from moving in the axial direction is formed integral with the second rotation member.

4. The compressor of claim 3, wherein the means for preventing the balls from moving in the axial direction comprises at least one stopper portion of the hollow, wherein the stopper portion comprises a pair of side walls which contact the ball in the axial direction.

5. The compressor of claim 4, wherein each of the hollows of the second rotation member comprises a pair of stopper portions.

6. The compressor of claim 5, wherein the pair of stopper portions are adapted to contact opposite sides of a corresponding one of the balls.

7. The compressor of claim 4, wherein each of the hollows of the second rotation member comprises a single stopper portion, and the stopper portion is positioned on one side of the hollow in the axial direction.

8. The compressor to claim 1, wherein the second rotation member comprises a pair of seal members, and wherein a first of the seal members has a first edge which contacts the first rotation member, and a second of the seal members has a second edge which contacts the ring plate, such that an area defined by the first rotation member, the second rotation member, and the ring plate is sealed off by the seal members.

9. The compressors of claim 8, wherein the pair of seal members extend from the second rotation member towards the first rotation member and the ring plate, respectively, in a direction offset from the radial direction and the axial direction.

10. The compressor of claim 8, wherein the pair of seal members have edges which contact the first rotation member and the ring plate, respectively, in the axial direction.

11. The compressor of claim 8, wherein the pair of seal members comprise elastic seal lips.

12. The compressor of claim 8, wherein the second rotation member comprises a rubber ring formed integral with the seal members.

13. A power transmission mechanism comprising:
a shaft;
a first rotation member fixed to the shaft, wherein the first rotation member comprises a plurality of accommodation portions;
a second rotation member rotatably arranged around the periphery of the first rotation member, wherein the second rotation member has an inner surface facing the first rotation member, and the second rotation member comprises a plurality of recessed hollows formed in the inner surface;
a plurality of balls, wherein a first portion of each of the balls is positioned within at least one of the accommodation portions and a second portion of each of the balls is positioned within at least one of the hollows, such that a rotational motion of the second rotation member is transmitted to the first rotation member via the balls; and
a ring plate adapted to apply a predetermined amount of force to the balls, wherein the predetermined amount of force is sufficient to maintain the balls within their corresponding at least one accommodation portion, and wherein the second rotation member comprises means for preventing the balls from moving in an axial direction within their corresponding at least one hollow.

14. The power transmission mechanism of claim 13, wherein each of the accommodation portions comprises:
a pedestal portion arranged on the periphery of the first rotation member in the radial direction, wherein each of the pedestal portions are adapted to support a corresponding one of the balls; and
a pocket formed within the pedestal portion, such that the corresponding ball moves into the pocket when an inside wall of the hollow applies a force to the corresponding ball in a direction which is opposite to the predetermined force.

15. The power transmission mechanism of claim 13, wherein the means for preventing the balls from moving in the axial direction comprises at least one stopper portion of the hollow, wherein the stopper portion comprises a pair of side walls which contact the ball in the axial direction.

16. The power transmission mechanism to claim 13, wherein the second rotation member comprises a pair of seal members, and wherein a first of the seal members has a first edge which contacts the first rotation member, and a second of the seal members has a second edge which contacts the ring plate, such that an area defined by the first rotation member, the second rotation member, and the ring plate is sealed off by the seal members.

17. The power transmission mechanism of claim 16, wherein the pair of seal members extend from the second rotation member towards the first rotation member and the ring plate, respectively, in a direction offset from the radial direction and the axial direction.

18. The power transmission mechanism of claim 16, wherein the pair of seal members have edges which contact the first rotation member and the ring plate, respectfively, in the axial direction.

19. The power transmission mechanism of claim 16, wherein the pair of seal members comprise elastic seal lips.

20. The power transmission mechanism of claim 16, wherein the second rotation member comprises a rubber ring formed integral with the seal members.

* * * * *